W. A. SHIPPERT.
COW MILKING APPARATUS.
APPLICATION FILED OCT. 16, 1918. RENEWED DEC. 17, 1920.
1,385,500.
Patented July 26, 1921.
2 SHEETS—SHEET 2.
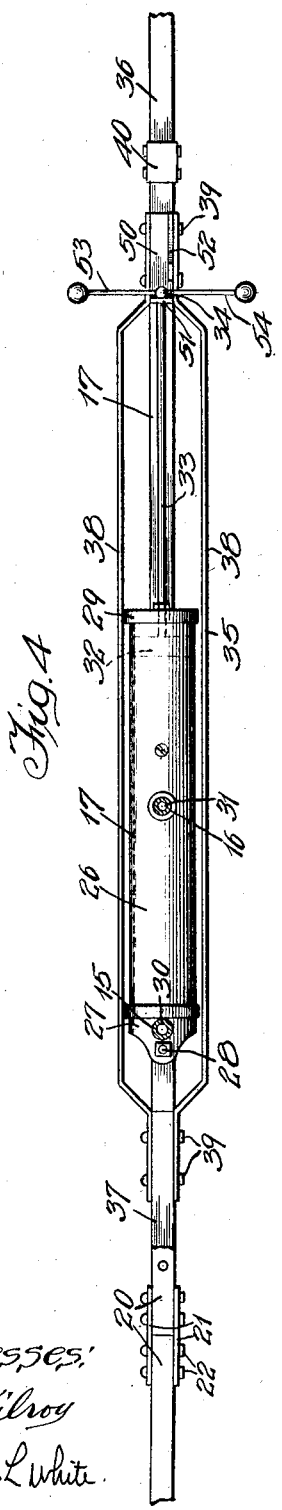
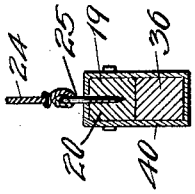
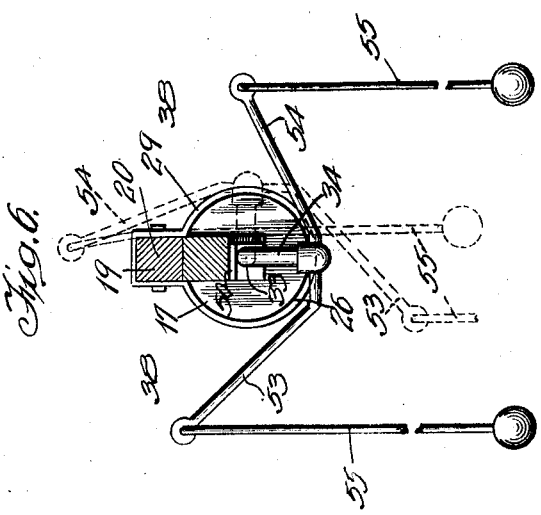
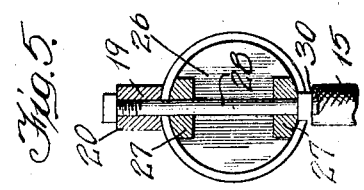

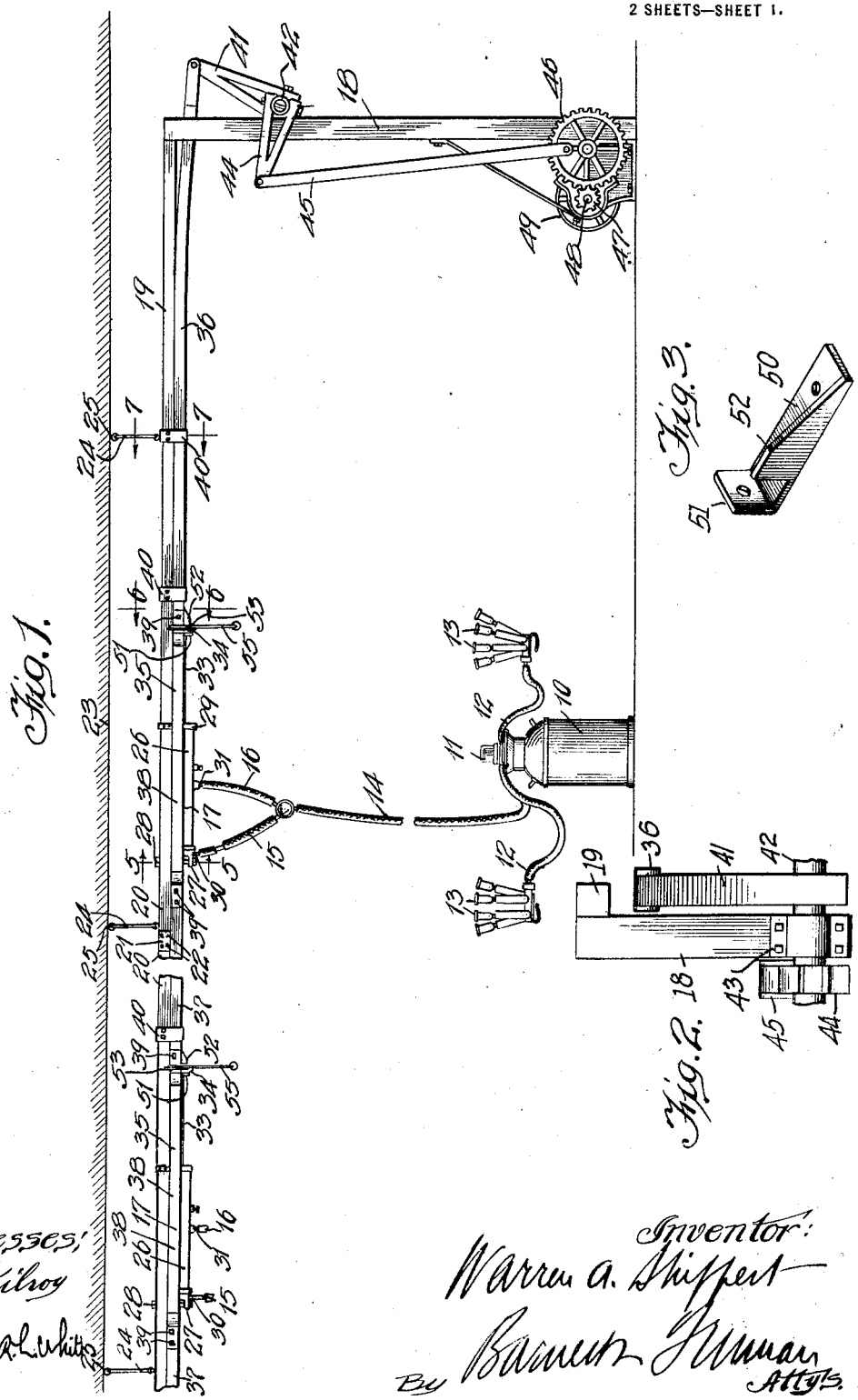

UNITED STATES PATENT OFFICE.

WARREN A. SHIPPERT, OF CHICAGO, ILLINOIS, ASSIGNOR TO THE BURTON PAGE COMPANY, OF CHICAGO, ILLINOIS, A CORPORATION OF ILLINOIS.

COW-MILKING APPARATUS.

1,385,500.   Specification of Letters Patent.   Patented July 26, 1921.

Application filed October 16, 1918, Serial No. 258,357. Renewed December 17, 1920. Serial No. 431,499.

*To all whom it may concern:*

Be it known that I, WARREN A. SHIPPERT, a citizen of the United States, residing at Chicago, in the county of Cook and State of Illinois, have invented certain new and useful Improvements in Cow-Milking Apparatus, of which the following is a specification.

My invention relates to apparatus for milking cows of the type employing suction or milking pumps operated by an engine or other motor; and the principal objects of the invention are: to provide an apparatus of this type which may be manufactured, shipped and set up at low cost; to provide an apparatus the parts of which may be sent to the user in knock-down form and which may be set up in the cow barn and removed therefrom when necessary with a minimum of labor by a person who is neither a skilled mechanic nor a carpenter; and, finally, to provide, in milking apparatus, certain novel arrangements of the pumps and the means for engaging them with and disengaging the same from the driving mechanism of the apparatus whereby it will be possible to use a single milk receptacle and set of attachments, that is to say, a single milking unit, which may be operatively connected to the apparatus in different places in the barn in a manner which will be simple and convenient and readily understandable by the milker.

The invention consists in the novel and improved arrangements, devices and constructions, to be hereinafter described and claimed, for carrying out the above stated objects and such other incidental objects as will appear from the following description of the preferred embodiment of the invention disclosed in the accompanying drawings.

In the drawings,

Figure 1 is a fragmentary side elevation of the milking apparatus.

Fig. 2 is a fragmentary end elevation of the same.

Fig. 3 is a view, in perspective, of one of the devices on the driving element for furnishing engagement between the driving element and adjacent pump.

Fig. 4 is an inverted plan view of one of the pumps, the supporting structure to which the support is attached and the driving element which operates the pump, and Figs. 5, 6 and 7 are sectional views on lines 5—5, 6—6 and 7—7 respectively, of Fig. 1, these views being on a larger scale than Fig. 1.

Like characters of reference designate like parts in the several figures of the drawings.

The part of the apparatus which I have termed the milking unit consists preferably of a milk receptacle 10 on which is arranged a milk receiving chamber 11 to which are connected the tubes 12 extending to the teat cups 13 and a tube 14 having branches 15 and 16 adapted to be connected with one of the suction or milking pumps 17 of the apparatus. This much of the apparatus forms no part of my present invention which is concerned with certain apparatus, to be hereinafter described, for operating the pumps 17. The milking unit shown is of the type patented in my Patent 1,264,214 granted April 30, 1918, to which reference is made. So far as my present invention is concerned a different type of milking unit might be employed in place of the one shown.

The present invention contemplates the arrangement of a number of pumps which are located in different parts of the cow barn, and may be permanently fixed, if desired, to a supporting structure or structures to which they may remain attached at all times.

The invention further contemplates the use of a single milking unit, as the milk receptacle and its attachments may be termed, which may be carried from place to place in the cow barn and operatively connected with any of the different pumps as may be convenient. Finally, the system of operation involves the employment of a single driving element, or gang of driving elements actuated simultaneously to which each of the pumps may be operatively connected when such pump is to be used for performing the milking operation and from which the pump is disconnected when the milking unit is moved to a different position in the barn.

The supporting structure for the pumps and for the driving element is preferably constructed as follows: 18 is an upright member and 19 a horizontal member secured thereto, the latter consisting preferably of a plurality of timbers 20, 20 arranged end to end and fastened together by metal plates 21 and bolts 22. The horizontal supporting member 19 may be suspended from the ceiling 23 of the cow barn by short cords 24 attached to the ceiling and to the supporting member by screw-eyes 25, 25.

The pumps comprise, in each case, a pump cylinder 26 formed at one end with ears 27 bolted to one of the timbers 20 of the supporting structure by a bolt 28. The other end of the cylinder is preferably secured to the timber by a metal strap 29. The pump cylinder is formed with a pair of nipples 30, 31 to which the flexible tubes 15 and 16 may be attached. The piston 32 of the pump is provided with a piston rod 33 formed at its outer end with a right-angle portion 34 which is adapted to be engaged with or disengaged from the driving element of the apparatus.

The driving element 35 for operating the pumps consists preferably of a number of strips of wood 36, 37 arranged in alinement, spaced one from the other and connected together, in each case, by a pair of metal strips 38 which are secured to the wooden strips by bolts 39 and are formed so that each pair of metal strips straddles one of the pumps. The driving element 35 is slidably supported from the horizontal supporting member 19 by means of metal stirrup pieces 40 arranged at suitable intervals.

The driving element 35 is pivoted at one end to an arm 41 rigidly connected with a rock shaft 42 mounted in a suitable bearing block 43 on the upright support 18. Rigid with the rock shaft and on the other side of support 18 is an arm 44 which stands at an angle to arm 41 and has pivoted to its outer end a pitman 45 which is connected at its lower end eccentrically with a gear wheel 46 driven by a pinion 47 on the shaft 48 having a belt pulley 49 for connection with a motor or engine (not shown). These driving arrangements for the pitman are purely optional and may be varied as circumstances require.

To the outer extremity of each of the wooden strips 36, 37 is secured, on the under side of the strip, a piece of metal 50 (Fig. 3) bent to provide depending lugs 51, 52 which are adapted to be engaged by the bent end 34 of the piston rod 33 of the pump. This engagement can be made by giving the piston rod with its piston a partial rotation in the pump cylinder. For convenience the bent end of the piston rod is provided with a pair of oppositely projecting cranks 53, 54 to which pull cords 55 are connected. In Fig. 6 the full lines indicate the position which the piston rod takes when disengaged from the lugs 51, 52 on the driving element. The dotted lines indicate the engaged position of the piston rod and the parts associated therewith.

In the apparatus shown in the drawing the pumps are arranged in alinement in a single series. It will be possible to provide an apparatus consisting of a plurality of series of pumps arranged in parallel on supporting horizontal members and operated by a plurality of driving elements from the single rock shaft 42.

Operation: The milker attaches the flexible tubes 15, 16 of the milking unit to one of the pumps 17 and by pulling on the appropriate pull cord 55 operatively connects this pump to the driving element 35. After milking the cows which can be conveniently reached from this location the pump in question is disconnected from the drive and the milking unit removed to another place in the barn where it is connected with the nearest pump which is in turn engaged with the driving element in the manner described. The arm 41 is preferably made longer than the arm 44 so that a long stroke is given to the driving element. The strip 36 of the driving element which is connected to the arm 41 is sufficiently flexible so that it will easily bend a trifle as the arm rocks back and forth.

It will be observed that the apparatus consists of parts which may be shipped in the knock-down state and which when received by the user may be assembled and set up in the cow barn by a person who has little or no knowledge of mechanics or carpentry. The apparatus does not form a permanent installation but may easily be removed if occasion require.

I claim:

1. In milking apparatus, the combination with a series of stations at which milk receiving means are adapted to be positioned, of a series of milking pumps, one arranged adjacent each of said stations, a driving element and means for severally operatively connecting or disconnecting said pumps from said driving element.

2. In milking apparatus, the combination with a series of stations at which milk receiving means are adapted to be positioned during the milking operation, of a series of milking pumps, one pump supported adjacent each of said stations and having means thereon for operative connection with said milk receiving means, a reciprocating driving element for said series of pumps and means for severally operatively connecting and disconnecting said pumps at will from said driving element.

3. In milking apparatus, the combination with milk receiving means, of a plurality of milking pumps comprising, in each case, piston and cylinder members one fixed and the other reciprocable and revoluble on its axis, a driving element for operating said reciprocable pump members, and means connected with one of said members of each pump whereby said pump members may be revolved to severally operatively engage and disengage said pumps from said driving element.

4. In milking apparatus, the combination with milk receiving means, of a plurality of milking pumps comprising, in each case, a fixed cylinder, a piston and rod reciprocable and revoluble in said cylinder, a driving element, and means for revolving said pistons in their cylinders and for engaging or disengaging said pistons from said driving element.

5. In milking apparatus, the combination of milk receiving means, of a supporting structure, a plurality of milking pumps comprising stationary and reciprocating members, the former secured to the under side of said supporting structure, a driving element slidably sustained from said supporting structure, and means whereby the reciprocating members of the pumps may be severally connected with or disconnected from said driving element.

6. In milking apparatus, the combination with milk receiving means, of a plurality of milking pumps comprising, in each case, a fixed cylinder and a piston and rod reciprocable and revoluble in said cylinder, the piston rod being formed with a bend at its extremity, and a reciprocating driving element provided with means adapted to be engaged by the bent extremities of said piston rods for severally connecting or disconnecting said pumps from said driving element.

7. In milking apparatus, the combination with milk receiving means, of a plurality of milking pumps comprising, in each case, a fixed cylinder and a piston and rod reciprocable and revoluble in said cylinder, the piston rod being formed with a bend at its extremity, a reciprocating driving element provided with means adapted to be engaged by the bent extremities of said piston rods whereby the pumps may be operatively connected with or may be disconnected from said driving element, and a pair of cranks for each piston rod connected at opposite sides to the end of the bent portion of the piston rod provided with pull members for the purpose described.

8. In milking apparatus, the combination of a supporting structure comprising timbers secured together end to end, and means for suspending the same from the ceiling of the cow barn, a plurality of milking pumps fixed to said structure, a driving element comprising a plurality of wooden strips arranged end to end in spaced relation, a pair of spaced metal straps connecting each strip with the adjacent strip and lying on opposite sides of said pump, means for slidably supporting said driving element from the supporting structure, means for reciprocating said drivng element, and means whereby the pumps may be severally connected with or disconnected from the driving element.

9. In milking apparatus, the combination of a supporting structure comprising an upright member and a horizontal member, means for suspending the latter from the ceiling of the cow barn, a plurality of pumps fixed to said structure, a driving element comprising a plurality of members arranged end to end in spaced relation, and a pair of spaced metal straps connecting each member with the adjacent member and lying on opposite sides of said pumps, means for slidably supporting said driving element from the horizontal supporting member, a rocking element on the upright supporting member engaged with the driving element, and means for imparting rocking movement to said rocking member.

10. In milking apparatus, the combination of a supporting structure comprising timbers secured end to end and means for suspending the same from the ceiling of the cow barn, a plurality of milking pumps fixed to said structure, a driving element comprising a plurality of wooden strips arranged end to end in spaced relation, and a pair of spaced metal straps connecting each strip with the adjacent strip and lying on opposite sides of said pumps, stirrup members attached to the supporting structure for slidably sustaining the driving element, means for reciprocating said driving element, and coöperating engaging devices associated with the driving element and pumps whereby the pumps may be operatively connected with or disconnected from the driving element.

11. In milking apparatus, the combination of a horizontal supporting member, a plurality of pump cylinders secured thereto at intervals, a driving element slidably arranged on said support having portions which extend around the pump cylinders, pistons in said cylinders having piston rods, the extremities of which are formed with bends, and engaging devices on said driving element with which, through rotation of the pistons and piston rods the bends of the piston rods may be engaged by said driving element.

12. In milking apparatus, the combination of a horizontal supporting member, a plurality of pump cylinders secured thereto at intervals, a driving element slidably arranged on said support having portions which extend around the pump cylinders, pistons in said cylinders having piston rods, the extremities of which are formed with bends, engaging devices on said driving element with which, through rotation of the pistons and piston rods the bends of the piston rods may be engaged by said driving element, the bent ends of the piston rods being provided, in each case, with a pair of oppositely arranged cranks, and pull members for the purpose described.

13. A milking apparatus comprising in combination a horizontally arranged supporting member, a pump secured thereto, a driving element substantially parallel with and slidably mounted on said supporting member having a portion which surrounds said pump, and means whereby the pump may be operatively connected with or disconnected from said driving element.

14. A milking apparatus comprising in combination a horizontally arranged supporting member, a pump cylinder secured thereto, a piston in said pump having a rod, the outer end of which is formed with a bend, a reciprocating driving element substantially parallel with the supporting member and slidably sustained thereon having a portion extending around said pump cylinder, and a pair of lugs on said driving element with which the bent end of said piston rod is adapted to engage.

15. A milking apparatus comprising, in combination, a horizontally arranged supporting member, a pump cylinder secured thereto, a piston in said pump having a rod, the outer end of which is formed with a bend, a reciprocating driving element substantially parallel with the supporting member and slidably sustained thereon having a portion extending around said pump cylinder, a pair of lugs on said driving element with which the bent end of said piston rod is adapted to engage, and a pair of cranks projecting from opposite sides of the end of the bent portion of the piston rod provided with pull members for the purpose described.

16. Milking apparatus comprising, in combination, a horizontal support and means for suspending the same from the ceiling of the cow barn, a pump cylinder secured to the under side of said support, a piston in said cylinder having a piston rod the end of which is formed with a bend, a reciprocating driving element comprising two members arranged end to end in spaced relation and secured together by straps which extend around said pump cylinder, and means providing lugs on the under side of said driving element with which the bent end of the piston rod is adapted to engage.

17. In cow milking apparatus, the combination of an upright support, a rock shaft mounted on said support provided with a pair of rigid arms standing at an angle to each other, means attached to one of said arms for rocking said rock shaft, a horizontal support fixed at one end to the upright support and provided with means for suspending it from the ceiling of the cow barn, a plurality of pump cylinders secured to the under side of said horizontal support, a driving element pivoted to the other arm on the rock shaft and comprising members arranged end to end in spaced relation and straps connecting said members which lie on opposite sides of said pump cylinders, pistons in said pump cylinders having piston rods the ends of which are bent and provided with oppositely projecting cranks having pull members, and means on said driving element providing pairs of depending lugs with which the bent ends of said piston rods are adapted to be releasably engaged.

18. In milking apparatus, the combination of milk receiving means, a substantially horizontal supporting element, a pump carried thereby comprising a reciprocating member, a transmission element arranged under and slidably connected with the supporting element and provided with means for engaging the reciprocating member of the pump.

19. In milking apparatus, the combination of milk receiving means, a substantially horizontal supporting element, a hanger for sustaining said member from the ceiling of the cow barn, a pump carried by the supporting element comprising a reciprocating member, a transmission element arranged under and slidably connected with the supporting element and provided with means for engaging the reciprocating element of the pump.

20. In milking apparatus, the combination of milk receiving means, a substantially horizontal supporting element, a pump carried thereby comprising a reciprocating member, a transmission element arranged under and parallel with the supporting element, guiding devices fixed to the supporting element for slidably supporting the transmission element, and means on the transmission element for engaging the reciprocating member of the pump.

21. In milking apparatus, the combination of milk receiving means, a substantially horizontal supporting element comprising sections secured together end to end, a plurality of pump carrying devices on said supporting element, a transmission element slidably supported on the supporting element comprising sections secured together end to end and provided with pump engaging devices.

22. In milking apparatus, the combination of milk receiving means, a substantially horizontal supporting element comprising sections secured together end to end, a plurality of pump carrying devices on said supporting element, a transmission element arranged under and slidably connected with the supporting element comprising sections secured together end to end and provided with pump operating devices.

WARREN A. SHIPPERT.